Aug. 12, 1969     E. G. HEYL     3,460,951
METHOD FOR FORMING A CLOSURE FOR BOTTLES
AND OTHER CONTAINERS
Original Filed May 2, 1955
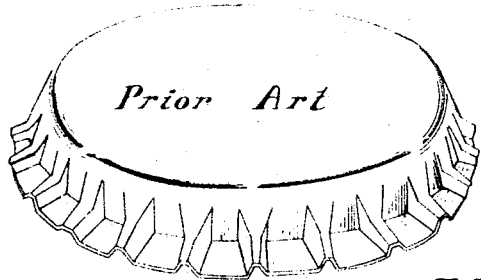
FIG. 1.     FIG. 2.
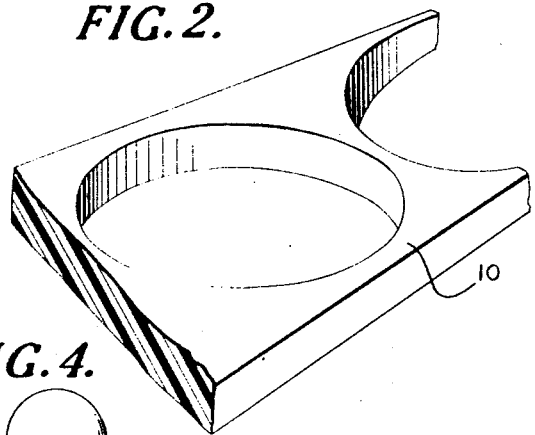
FIG. 3.    FIG. 4.
FIG. 6.
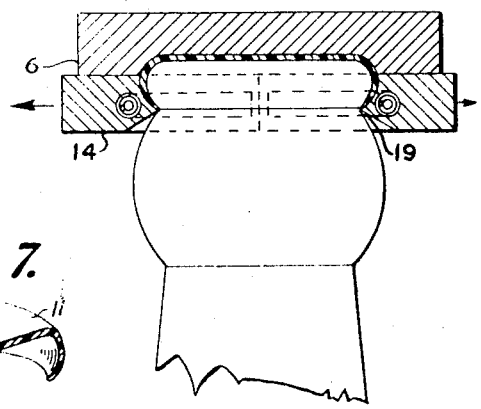
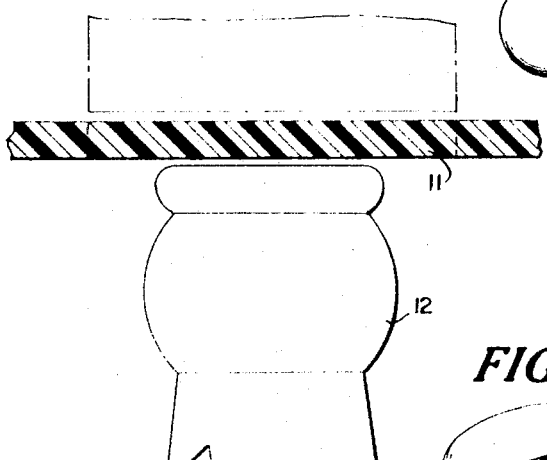
FIG. 7.
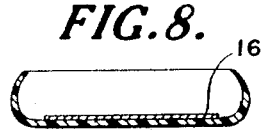
FIG. 5.
FIG. 8.
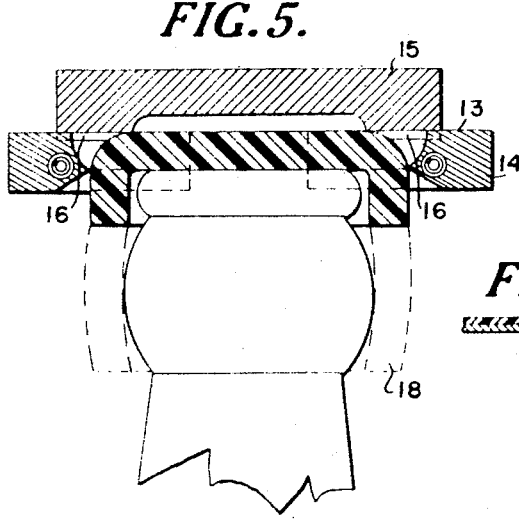
FIG. 9.
FIG. 10.
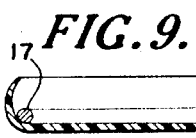
INVENTOR
EDGAR G. HEYL
BY Cushman, Derby & Cushman
ATTORNEYS United States Patent Office 3,460,951
Patented Aug. 12, 1969

3,460,951
METHOD FOR FORMING A CLOSURE FOR BOTTLES AND OTHER CONTAINERS
Edgar G. Heyl, Baltimore, Md., assignor to W. R. Grace & Company, Duncan, S.C., a corporation of Connecticut
Original application May 2, 1955, Ser. No. 505,415. Divided and this application Aug. 4, 1967, Ser. No. 658,432
The portion of the term of the patent subsequent to Mar. 28, 1978, has been disclaimed
Int. Cl. B67b *3/02;* B65b *7/28*
U.S. Cl. 99—214                         10 Claims

ABSTRACT OF THE DISCLOSURE

A method for forming a closure for a container is provided wherein a sheet of heat shrinkable polymer is placed over the top of the container and a cover portion is formed from the sheet having an area overlying the open end of the container and an edge portion extending downwardly over the lip of the container to form a skirt therearound. Heat is then applied to the skirt portion to cause the skirt portion to shrink and snugly fit the coextensive external area of the container. The container may be filled before sealing and the sealed container contents may be subsequently heat treated.

---

This application is a division of application Ser. No. 505,415, filed May 2, 1955, now abandoned.

This invention relates to a method for forming a closure for bottles, jars, cans and similar types of containers usually made of glass, plastic, metal or fiber.

The closure is useful in sealing containers having a finish or capping area suitable for receiving and retaining "crown," lug, screw, or pressed-on types of caps.

The principle object of this invention is to provide a method for forming a closure made of heat-shrinkable plastic, which will produce a seal conforming to the sealing surface or area of the container.

Shrinkable closures are known, but the types prepared to date have objections which have somewhat mitigated against their commercial use.

I find that certain of the shrinkable linear condensation polymers of high molecular weight have good sealing qualities and are applicable as closures. For instance, closures made of such polymers will shrink rapidly under moderate heat to a substantially unshrinkable state. Particularly, the plastic has a high melting point so that containers which have been filled with products which are subsequently to be heat-treated, namely, cooked or sterilized, may have a closure of a material which will withstand temperatures up to 240° C. or higher for extended time periods, whereby the contents may be heat-treated after filling without disturbing the sealing of the container. Such plastic materials also are tough, have a high tensile strength, as well as a high impact strength, high bursting strength and high tear strength and break elongation. This is important where sterilization is conducted in the container or other heat treatment applied which would generate a high pressure as, for example, when pressure beverages, such as beer, are sterilized in the container after sealing, e.g., by heating to 100° C. Equally important is the low gas and moisture vapor transmission quality of the plastic materials whereby it is possible to maintain carbonated beverages, for example, with their initial high state of carbonation so that they will not ultimately become flat and unsalable. Again, closures of the plastic materials possess high abrasion resistance and are transparent in the thickness employed, namely, about 2 to 10 mils, preferably 5 mils, and, in addition, are capable of being nicely printed upon and decorated. I find that the shrinkable plastics are inert and non-toxic to foods and beverages and medicines to such an extent that this invention may be widely used for the bottling or packaging of such articles in sealed containers. In addition to the foregoing advantages, since the shrinkable material of the films from which the closures are formed usually do not require any plasticizer, the closures are not subject to degradation with time.

Closures of the type described in this application may be produced by high speed continuous equipment and lend themselves to continuous high speed application to and formation on the container. Notwithstanding that the film of which the closure is formed is tough, the closure can be readily removed or opened with a knifepoint. When the film is not printed, the transparency determines inspection of the contents which, of course, is of definite advantage in many cases. Moreover, the low weight of the discs from which the caps are formed reduces shipping cost and since the caps are formed at the time of capping the containers, only the discs need be initially shipped, which will result in the use of smaller shipping containers.

The closures of the present invention are preferably formed of Terylene, as disclosed in the patent to Whinfield, 2,465,319 and commercially termed "Mylar," as made and sold by E. I. du Pont de Nemours & Co., which plastic has been modified to render it shrinkable, as disclosed in the patent to Swallow et al. 2,497,376, and resists temperatures up to 240° C. and higher. The Whinfield and Swallow patents are hereby incorporated in their entirety into the disclosure.

The terylenes described in the Swallow patent are preferred, namely, the shrinkable polymers of an ester of trephthalic acid and a glycol having 2 to 10 carbon atoms, and especially desirable is polyethylene terephthalate, which has surprisingly good sealing qualities and applicability as a closure, by reason of possessing all of the aforesaid properties.

Other heat-shrinkable linear condensation polymers of high molecular weight which are useful and equivalents are the stretched, i.e. preferably bi-laterally stretched synthetic linear polyamides of the class known as nylon, e.g., polyhexamethylene adipamide and sebacamide, the polymer of epsilon caprolactam, as well as the polyamides and polyesters disclosed in Corothers Patent 2,071,250, the entire disclosure of which is herein incorporated by reference into this application, and linear polyurethanes made, for example, by condensing a di-isocyanate with a dihydric alcohol, e.g., the condensation product of toluene di-isocyanate with ethylene glycol.

Referring to the drawings:

FIGURE 1 is a perspective view of a conventional crown closure;

FIGURE 2 is a perspective view of a strip of plastic, e.g., as "Mylar" from which closure-forming discs have been punched, the thickness of the strip being greatly exaggerated;

FIGURE 3 is an assembled view showing the punch operating upon the strip of FIGURE 2 to punch out a disc and indicating the location of the disc with relation to the sealing lip of the container;

FIGURE 4 is an elevation of one of the discs;

FIGURE 5 is a sectional view showing the manner in which the disc of FIGURE 3 or FIGURE 4 is applied over the lip of a container first to form the closure generally and thereafter to heatshrink the same;

FIGURE 6 is a sectional view showing the closure conformed and shrunk upon the sealing lip of the bottle;

FIGURE 7 is a perspective view partly cutaway showing the formed closure of FIGURE 6 which, if desired, may be removed from the container and used again as a reseal for the same or other containers;

FIGURE 8 is a sectional view showing the preformed or formed closure of FIGURE 6 provided with a sealing liner of some other plastic or paper, cork, or rubber which are not preferred since one of the great advantages of the present closure is the fact that it may be used without the necessity of including such a liner; however, in some cases a liner may be desired;

FIGURE 9 is a view similar to FIGURE 8 showing the closure provided with a ring liner or seal which may be of the usual flat jar ring type, but preferably is of the O-ring style and produces a satisfactory side seal which may be desired in some cases, although not required, as indicated above; the ring or gasket being made of rubber, plastic or material as described herein; and FIGURE 10 is a sectional view showing the preferred plastic, e.g., shrinkable "Mylar" laminated with another plastic such as dual oriented polyvinyl chloride, biaxially oriented polyethylene or biaxially oriented polystyrene, the layers being united in any suitable manner, for instance, by means of an adhesive such as an epoxy resin, e.g., bisphenol A-epichlorhydrin.

In carrying out the invention the shrinkable Terylene strip 10 has punched from it suitable discs 11 either at the point of manufacture as in FIGURE 4, or at the point of use as in FIGURE 3. The disc in either event is disposed over the lip of the container 12 as shown in FIGURE 3 and may thereafter be applied and formed as a seal in a number of ways. For instance, the disc is drawn over the lip of the bottle by means of the die member indicated as a whole at 13 in FIGURE 5 and 6 and after being so pulled over the sealing lip of the container, heat is applied to shrink the material of the closure uniformly as shown in FIGURE 6, so that it conforms to the surface of the sealing lip and provides a tight seal which will not require the use of a liner.

The closures formed in this manner are illustrated in FIGURE 7, while in FIGURE 8 they are shown provided with suitable liners or sealing rings of rubber or other resilient sealing material.

In the operation of the apparatus generally shown in FIGURES 5 and 6, the lower die member 14 first strikes the disc 11 to fold it as shown in FIGURE 5, whereupon the upper die member 15 engages the disc to accelerate and control this fold to conform to the surface of the lip of the container as shown in FIGURE 6. The lower die members 14 are in the form of a pair of semi-circular rings slidably movable in grooves 16 in the bottom of the block or die 15, so that when the block has reached the position shown in FIGURE 6, these ring members move inwardly to complete the conforming of the closure to the sealing lip as shown in FIGURE 6. The reciprocating ring members 14 carry heating means of any suitable type such as an induction coil and, by reason of the heating which is developed, the cap is uniformly shrunk upon the lip of the container as shown in FIGURE 6.

The finished closure as illustrated in FIGURES 6 and 7 may be removed and used as reseal if desired.

There may be applied to the disc and adhered thereto in any suitable manner, a liner of paper, cork, etc., as shown at 16 in FIGURE 8, or a reseal ring of rubber or plastic as shown at 17 in FIGURE 9.

The strip 11 may be laminated to a different material 19 as indicated above and as illustrated in FIGURE 10.

Referring to FIGURE 5, the disc is preferably oversized as shown, so as to give ample room for the initial forming and subsequent heat-shrinking operation. The disc may be large enough to provide an extended shirt indicated at 18 in FIGURE 5, but this is not essential. Likewise, it is not necessary that the skirt of the cap fit under the flange of the sealing lip as shown at 19 in FIGURE 6, the present invention enabling the cap skirt to conform to any configuration whether it be vertically plane or a curved lip as shown in FIGURE 6, or whether the finish of the container be of the screw, lug, pressed-on or snap-on type. In brief, the heat-shrinkability of the cap enables it to conform to practically any usual sealing surface now conventionally available in containers of all types.

What is claimed is:

1. A method of forming a closure having a central portion and a skirt for containers from a heat shrinkable polymer and applying the same to said containers comprising placing a sheet of said polymer over the top of a container, forming from said sheet a cover portion thereof of an area to overlie the open end of the container and to have an edge portion extending downwardly over the lip of container to form a skirt therearound, and applying heat to the skirt portion of said sheet whereby the heated area of the skirt portion will shrink and snugly fit the coextensive external area of the container.

2. The method according to claim 1 wherein said closure is formed of biaxially oriented polyethylene laminated to shrinkable polyethylene terephthalate.

3. A method of forming a closure having a central portion and a skirt for containers from a heat shrinkable polymer and applying the same to said containers comprising placing a sheet of said polymer over the top of a container, forming from said sheet a cover portion thereof of an area to overlie the open end of the container and extend beyond the marginal edge of the same, turning the extended edge portion downwardly over the lip of the container to form a skirt therearound, and applying heat to the skirt portion of said skirt whereby the heated area of the skirt portion will shrink and snugly fit the coextensive external area of the container.

4. The method according to claim 1 wherein said shrinkable polymer is an ester of terephthalic acid and a glycol having 2 to 10 carbon atoms.

5. A method according to claim 4 wherein the shrinkable ester is a polyethylene terephthalate.

6. The method according to claim 4 wherein the container is filled before the sealing and thereafter the contents of the sealed container are heat treated.

7. The method according to claim 6 wherein the container is filled with a pressure beverage.

8. A method of forming a closure having a central portion and a skirt for containers from a heat shrinkable polymer and applying the same to said containers comprising placing a sheet of said polymer over the top of the container, holding said sheet in place across the top of the container, forming from said sheet a cover portion thereof of an area to overlie the open end of the container and to have an edge portion extending downwardly over the lip of the container to form a skirt therearound, and applying heat to the skirt portion of said sheet whereby the heated area of the skirt portion will shrink and snugly fit the coextensive external area of the container.

9. A method according to claim 1 wherein the entire skirt portion of the sheet is heated and is shrunk to snugly fit the coextensive external area of the container.

10. A method of forming a closure having a central portion and a skirt for containers from a heat shrinkable polymer and applying the same to said containers comprising placing a film of said polymer over the top of the container, holding said film in place across the top of the container, forming from said film a cover portion thereof of an area to overlie the open end of the container by forcing an edge portion of the film downwardly over the lip of the container to form a skirt therearound and applying heat to the skirt portion of the film and shrinking the entire skirt portion of the film to snugly fit the coextensive external area of the container.

References Cited
UNITED STATES PATENTS

| | | | |
|---|---|---|---|
| 825,116 | 7/1906 | Engels | 53—43 X |
| 2,976,655 | 3/1961 | Dreyfus et al. | 53—42 |

ROBERT F. WHITE, Primary Examiner

J. H. SILBAUGH, Assistant Examiner

U.S. Cl. X.R.

53—42; 99—171; 264—230, 249, 342